Aug. 16, 1966     N. G. LIRONES     3,266,106
GRAPHITE MOLD AND FABRICATION METHOD
Filed Sept. 20, 1963
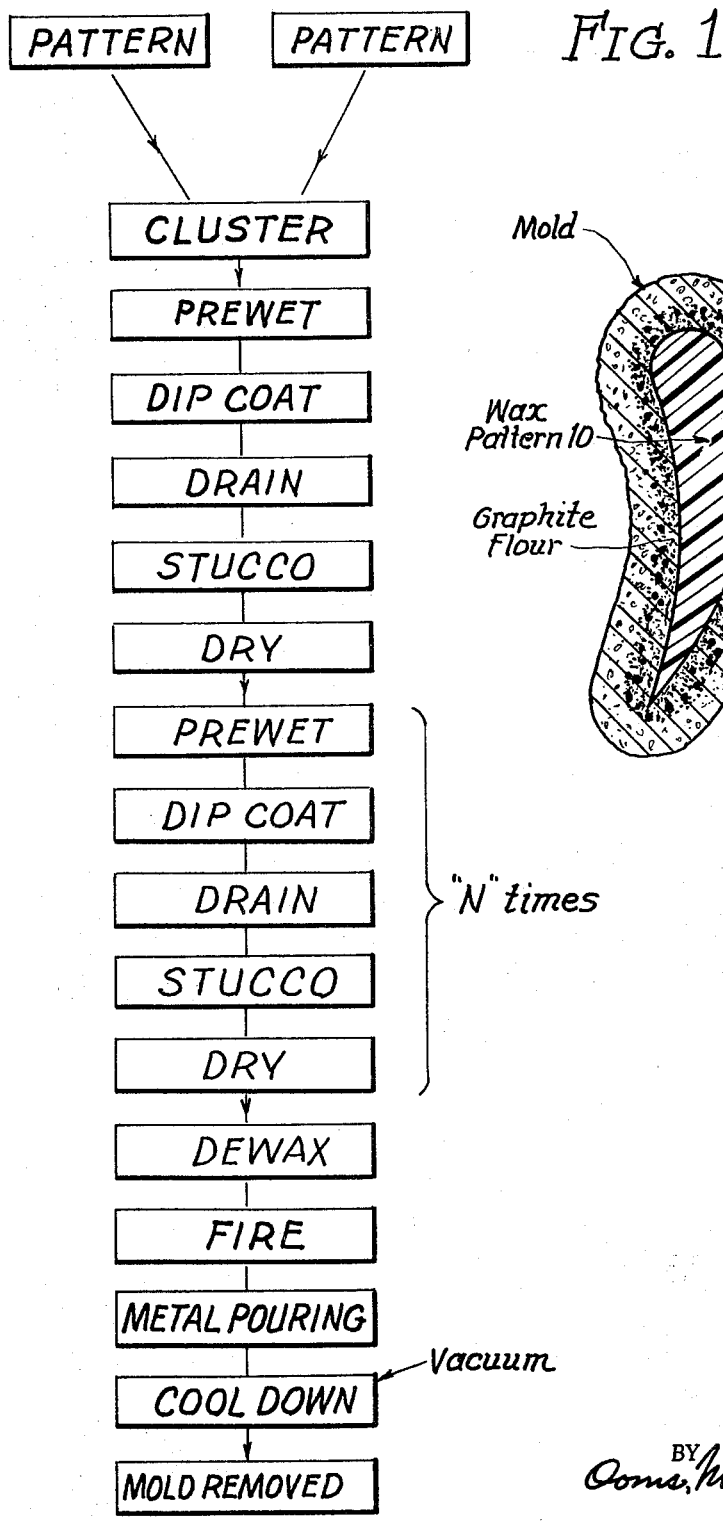
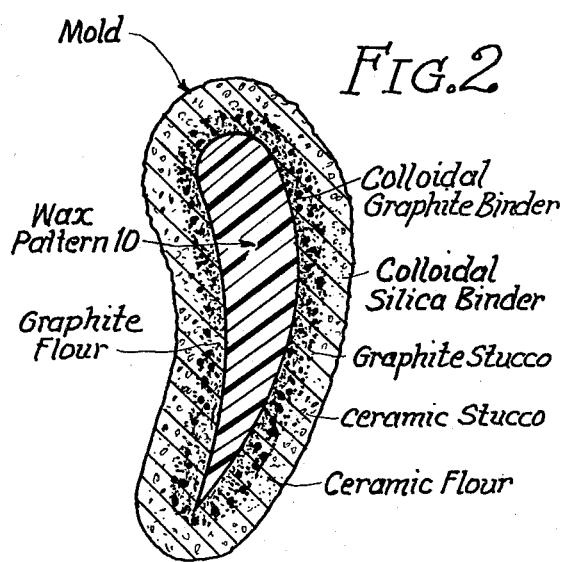
INVENTOR.
Nick G. Lirones
BY Ooms, McDougall & Hersh
Att'ys

United States Patent Office 3,266,106
Patented August 16, 1966

3,266,106
GRAPHITE MOLD AND FABRICATION METHOD
Nick G. Lirones, North Muskegon, Mich., assignor to Howe Sound Company, New York, N.Y., a corporation of Delaware
Filed Sept. 20, 1963, Ser. No. 310,354
7 Claims. (Cl. 22—129)

This invention relates to the art of precision casting and to materials employed in the practice of same and it relates more particularly to a casting process and to compositions and methods for the preparation of the molds for use in same.

It is an object of this invention to produce and to provide a method for producing new and improved molds for use in the precision casting of various materials and it is a related object to provide compositions for use in the preparation of same.

More specifically, it is an object of this invention to produce a mold which is of sufficiently high strength and stability to enable materials to be poured directly therein for molding; in which refractory or other high melting point metals can be molded; in which metals can be formed in a manner to minimize oxidation thereby to enable use of the process and materials in the molding of metals that have heretofore been difficult to shape, and it is a related object to provide a new and improved molding process which can be easily carried out for the precision casting of materials which have heretofore not been easily adaptable to molding and in which the molded products can be easily and efficiently separated from the mold cleanly to release the molded product.

These and other objects and advantages of this invention will hereinafter appear and for purposes of illustration, but not of limitation, an embodiment of the invention is shown in the accompanying drawing, in which—

FIG. 1 is a flow diagram of the process embodying the practice of this invention, and FIG. 2 is a schematic sectional view through a pattern having a mold formed therein in accordance with the practice of this invention.

In accordance with the practice of this invention, the inner portion of the mold immediately adjacent the disposable pattern is fabricated substantially entirely of graphitic materials while the major cross section, forming the outer portion of the mold, is formulated of the conventional ceramic materials in the dip coats and stucco coats, or of dip coats formulated to contain colloidal graphite as the binder component along with conventional ceramic flours, as will hereinafter be described, with the stucco comprising ceramic materials, such as zircon, alumina, silica and the like.

The concepts of this invention are embodied in two phases hereinafter referred to as the "mold phase" which includes the compositions employed in the manufacture of the mold and the method for the production thereof, and the "use phase" wherein the formed mold is employed in the process of molding compositions and materials including metals and materials heretofore incapable of forming into shapes.

The "mold phase" will be described with reference to compositions employed and the methods of manufacture in a representative process illustrating the practice of this phase of the invention.

In the following description, the term "pattern" will be used interchangeably with "cluster" to refer to the wax or plastic pattern 10 or a cluster formed of a multiplicity of such individual patterns. It will be understood that changes may be made in the details of formulation, materials and methods employed without departing from the spirit of the invention.

EXAMPLE 1
*Preparation of wax pattern and cluster*

The pattern 10 is formed of conventional materials disposable by heat or chemicals, as in the well known investment casting processes. In the illustrated modification, the pattern is molded under pressure in suitable metal molds by injection of molten wax to fill the mold and set the pattern. Instead, the pattern can be formed of a thermoplastic, synthetic resinous material or combinations of such plastics and wax.

If the mold is to be formed about more than one pattern, the plurality of patterns are connected by runners for communication with a pouring spout to form a completed cluster, or as described in the issued patent of Operhall et al. No. 2,961,751. Where, as in the instant process, the cluster is to be repeatedly dipped into a slurry, identified as a dip coat, it is desirable to provide a hanger rod for carrying the cluster and for suspending the cluster for drying and the like.

EXAMPLE 2
*Dip coat composition*

2.77 percent by weight solids of colloidal graphite (22% solids in aqueous medium—"Aquadag" of Acheson Industries, Inc., Port Huron, Michigan)
37.8 percent by weight solids of graphite flour (less than 200 mesh)
0.174 percent by weight emulsifying agent (gum tragacanth)
0.00325 percent by weight anionic wetting agent (sodium heptadecyl sulphate)
Remainder water As the colloidal graphite, it is preferred to make use of colloidal particles of graphite of less than 1 micron. For the purpose of reducing cost, use can be made of a combination of such colloidal graphite mixed with up to 50 percent by weight and preferably up to only 30 percent by weight of semi-colloidal graphite having a particle size of between 1-20 microns.

The amount of colloidal graphite in the dip coat composition may vary but it is desirable to make use of an amount greater than 0.5 percent by weight but less than 5 percent by weight and preferably an amount within the range of 1 to 3.0 percent by weight.

In the dip coat compositions represented by the above formulation, the emulsifying agents and the anionic wetting agents are preferred but not essential. Instead of gum tragacanth, use can be made of other hydrophilic colloids such as the gums, gelatins, alginates and the like, wherein, when used, such emulsifying agents are employed in an amount within the range of 0.01 to 0.5 percent by weight. Instead of the sodium heptadecyl sulphate wetting agent, other anionic surface active agents may be employed such as the allyl sulphates and the allyl aryl sulfonates and their salts. When employed, the amount of such surface active agent may range from 0.01 to 0.5 percent by weight of the composition.

The dip coat composition will have a pH within the range of 8.8 to 9.4 and a viscosity measured by the cup of Patent No. 3,011,986 of between 25-35 seconds.

The solids content, insofar as the colloidal or semi-colloidal graphite and graphite flour is concerned, can be varied quite widely, it being necessary only to formulate for a viscosity that can be handled to wet out the pattern and to make use of colloidal or semi-colloidal graphite in an amount sufficient to achieve the desired bonding action. For this purpose, it is deemed sufficient if the latter is present in an amount to make up more than 1.5 percent by weight of the graphite solids of the dip coat composition and it is usually undesirable and uneconomical to make use of an amount of colloidal or semi-colloidal graphite greater than 10 percent by weight of the graphite in the dip coat composition. It will be understood, however, that the essentially 100% graphite making up the solids in the dip coat composition can be achieved by the use of colloidal or colloidal and semi-colloidal graphite alone.

*Application of dip coat composition*

The wax pattern or cluster is first inspected to remove dirt, flakes and other objects which may have adhered to the surfaces of the wax patterns and which, if allowed to remain, would impair the preparation of a good mold and lead to an imperfect casting. The cleaned cluster is immersed into the dip coat composition, while being stirred, to cover all of the surfaces of the cluster with the exception of the lip of the pouring spout. To promote the elimination of air pockets, it is desirable to rotate the cluster while immersing in the dip coat composition. Instead of immersing the pattern in the stirred slurry of the dip coat composition for coverage of the surfaces of the pattern, the dip coat composition can be applied to achieve the desired coverage by spraying the dip coat composition onto the surfaces of the pattern. By this latter spraying technique the coating weight of the dip coat composition can be increased or decreased, as desired, by comparison with the amount of coating retained on the surfaces by immersion.

When fully coated, the pattern or cluster is suspended to drain excess dip coat composition. During drainage, the cluster can be inspected to detect air pockets which can be eliminated by addressing a stream of air onto the uncoated portions and thereafter allowing the slurry of the dip coat composition to flow onto the uncovered areas. While the cluster is being drained, it should be held in different planes designed to achieve uniform coating on all surfaces. In general, drainage should be completed within a few minutes but, in any event, in less time than would allow the dip coat composition to dry whereby the surface would not retain stucco in the desired uniform arrangement.

EXAMPLE 3

*Stuccoing*

After the cluster has been allowed to drain for a short time and while the surface is still wet with the dip coat composition, the surface is stuccoed with particles of graphite having the following particle size distribution:

| Tyler screen size: | Percent retained on screen |
|---|---|
| 65 | 62 |
| 100 | 29 |
| 150 | 7 |
| 200 | 1 |
| Pan | 1 |

The graphite will hereinafter be referred to as having a particle size of more than 150 mesh but less than 35 mesh. The particles of graphite are caused to flow over the surface of the pattern until the wet surface is substantially completely covered.

*Application of stucco coat*

After the uniformity of coating has been achieved with the dip coat composition, the stucco is sprinkled onto the wet surface while constantly changing the position of the cluster substantially uniformly to cover the dip coating with a layer of stucco, while at the same time minimizing flow of the dip coat composition whereby non-uniformities might otherwise develop. In practice, the graphite particles are rained down from above through a screening member which is constantly fed from a vibratory conveyor. The particles of graphite adhere to the wet coating and become partially embedded therein to become integrated with the coating formed on the wax patterns.

If the dip coat composition is adjusted to enable gellation to take place within a very short period of time, the stuccoed cluster need not be set aside for drying. However, it is preferred to slow the drying of the dip coat so that sufficient leeway is available for the desired drainage and stucco application. Thus it is desirable to provide for an air dry for a time ranging from 10–25 minutes. It will be understood that the drying time may be extended indefinitely beyond the times described without harm to the structure. If desired, drying of the combined coatings can be accelerated in a humidity controlled air circulating chamber heated to a temperature up to about 100° F.

The particle size of the graphite stucco is not critical since the particle size of the graphite can be varied over a fairly wide range. However, for best practice of this invention, it is preferred to make use of graphite having a particle size greater than 150 mesh and less than 20 mesh.

The operation is repeated, that is the pattern is again dipped into the dip coat composition and covered with fine particles of graphite to build up a second composite layer. In the preferred practice of this invention, it is desired, though not essential, to precede the immersion of the coated pattern in the dip coat composition with a prewetting step in which the prewetting composition employs substantially the same formulation as the dip coat composition with the exception that a lower viscosity is employed occasioned by the formulation to include additional amounts of water sufficient to reduce the total solids to about 25–75 percent of the solids in the dip coat composition. Thus the coated pattern is first submerged in the prewet composition more completely to penetrate and wet out the coated surface followed almost immediately by submersion in the dip coat composition after which the steps of drainage, stuccoing with the fine particles of graphite, and drying are carried out. Thus the layers become better integrated one with the other to produce a strong and composite shell structure.

The steps of prewetting, if used, dip coating and stuccoing with the described graphite systems can be repeated one or more times but, in accordance with the practice of this invention, after about the second, third or fourth cycle, the remainder forming the major cross section of the shell is built up by the use of slip coat compositions and stuccos of the inorganic or ceramic type. The following will illustrate dip coat compositions and stucco which may be used to build up the remainder of the shell mold:

EXAMPLE 4

*Dip coat composition*

8000 cc. colloidal silica (30% grade—specific gravity 1.198)
165 pounds zircon (99% through 325 mesh)
6150 cc. water
110 grams sodium fluoride

EXAMPLE 5

*Stuccoing composition*

Tabular alumina in the form of coarse particles greater than 14 mesh with less than 10% through 50 mesh Instead of making use of a dip coat composition formed substantially entirely of the ceramic materials or inorganic materials as described in Example 4, certain advantages are derived, as will hereinafter be pointed out, by the use of a dip coat composition for the subsequent coats wherein colloidal graphite is retained as a component in combination with ceramic inorganic materials conventionally employed as the flour and the like in the dip coat composition. The following will represent a dip coat composition of the type described:

EXAMPLE 6

11 pounds distilled water 8.8 pounds of a 22% dispersion of colloidal graphite in water
88 pounds zirconia of less than 325 mesh
200 cc. of anionic wetting agent (sodium heptadecyl sulphate)

The foregoing dip coat compositions of Examples 4 and 6 and the stucco of Example 5 can be built up onto the previously formed layers of the graphitic materials by procedures as previously described.

A mold having a wall thickness of from ¼ to ½ inch is usually sufficient for the molten metal casting of products of normal weight or dimension. Molds of greater wall thickness can be formed where greater strengths and self-sufficiency are desired for use in the molding of larger castings. The normal wall thickness of the mold can be achieved with the compositions described including from two to four cycles of dip coating, stuccoing and aging with the graphite systems of Examples 2 and 3 and with from three to eight additional coatings of the ceramic systems of Examples 4 to 6. Instead of alumina as a stucco, use can be made of Alundum, zircon, silica, and the like.

EXAMPLE 7

*Dewaxing*

After the composite mold has been produced, the disposable pattern is removed to leave a mold cavity in which the material to be molded may be cast. Pattern removal, hereinafter referred to as dewaxing, can be achieved in a number of ways:

(a) Use can be made of flash dewaxing wherein the composite is heated to an elevated temperature far above the melting point temperature of the wax or plastic. In a preferred process of flash dewaxing, the composite is heated to a temperature above 800° F. and preferably to a temperature within the range of 800–2200° F. for a time sufficient to eliminate the wax and to fire the mold. When the mold is exposed to a temperature in excess of 800° F. during dewaxing or firing, it is desirable to enclose the mold within a reducing or non-oxidizing atmosphere, otherwise the graphite binder will be burned out.

(b) Dewaxing can be carried out by a process referred to as "hot sand dewaxing" wherein sand heated to a temperature of 400–800° F. is arranged to surround the composite for intimate contact with the outer surfaces thereof whereby rapid heat transfer is achieved into the interior to melt out the wax. The hot sand can be poured about the mold or the mold can be buried in the hot sand. Instead of sand, use can be made of a metal or alloy system of low melting point such as the cerro alloys, low eutectic alloys, and the like.

(c) Dewaxing can be carried out with steam when the wax patterns are formed of a material having a melting point range below 200° F. For such purpose, the composite can be housed within a steam chamber or autoclave or else steam at relatively high pressure can be addressed onto the composite while it is suspended with the spout extending downwardly for drainage of the molten wax.

(d) Dewaxing can be carried out in an oven heated to a temperature above the melting point temperature of the wax but below the oxidizing temperature of the graphite, or preferably at a temperature within the range of 250–850° F. in a process referred to as "low temperature dewaxing," without the need to maintain a reducing atmosphere.

The mold is thereafter fired by heating to a temperature above 800° F. and preferably to a temperature within the range of 800–2200° F. Firing can be achieved by exposure of the mold to firing temperature for 15 or more minutes but it is preferred to fire the mold at a temperature within the range of 800–2200° F. for a time within the range of 15–120 minutes. Firing can be carried out concurrently with dewaxing when use is made of a high temperature dewaxing method as described in (a) above. Since graphite will be consumed when heated to a temperature above 800° F. in an oxidizing atmosphere, high temperature dewaxing and firing are carried out in an inert atmosphere and preferably in a reducing atomsphere. For this purpose, use can be made of hydrogen or an atmosphere composed of carbon monoxide.

Because of the thinness of the walls of the mold and the high heat conductivity of the graphite, heat penetrates rapidly through the mold to cause the wax portion of the pattern immediately adjacent the interior surfaces of the mold to be reduced to a molten state even before the remainder of the pattern has been heated to elevated temperature. Thus the liquefied portion leaves sufficient room to permit expansion of the remainder of the wax pattern when the cross section of the pattern is heated to elevated temperature thereby to eliminate strain on the mold which might otherwise lead to breakage.

The fired mold is cooled from firing temperature to a safe temperature below 800° F. before exposure to atmospheric conditions for continued cooling or for futrher processing.

To the present, description has been made of the mold phase wherein the inner portions of the mold coming into contact with the cast metal are formed entirely of graphite including colloidal graphite, graphite flour from the dip coat composition and graphite particles from the stucco, while the outer portions of the mold, out of contact with the cast metal, are formed of conventional ceramic materials to back up and reinforce the graphite layers whereby a high strength mold capable of use without investment is formed.

The description will hereafter be made to the "use" phase of this invention wherein use is made of the new and novel mold in the fabrication of shape products of molten metal.

Molten metal can be poured directly into the mold cavity of the mold for the fabrication of molded products of metals of the type generally limited to the field of precision casting. The mold possesses sufficient strength and has sufficient mass integrity to enable the molten metal to be poured into the mold without investment thereby to achieve the many advantages over investment casting, such as less weight, less material, more rapid heat-up, more rapid cooling, better control of tear strength, fuller inspection, lower scrap loss, and the like. The mold can be clamped to the furnace without additional reinforcement or support when the molten metal is poured therein. However, because of the nature of the mold formed of graphite in the inner portion, various modifications are required from conventional molding techniques.

While preheating is not essential, it is desirable to preheat the mold prior to metal pouring. When preheated to a temperature below about 800° F. it is not necessary to preheat in a reducing or inert atmosphere, but if the mold is to be preheated to a temperature above 800° F., it is essential either to preheat under vacuum conditions or in an inert or reducing atmosphere, as in an atmosphere of hydrogen or carbon monoxide, otherwise the graphite will be exposed to oxidizing conditions when at a temperature in excess of 800° F. Since most precision cast metals have a melting point in excess of 800° F., it is desirable to carry out metal pouring by conventional vacuum casting techniques wherein the mold, with or without preheat, is enclosed within a vaccum chamber in communication with a metal melting furnace whereby a vacuum can be drawn in the chamber in which the mold is mounted prior to metal pouring. The mold and the metal cast therein are maintained under vacuum until the metal has solidified or the assembly has cooled to a temperature below 800° F. Thereafter, the assembly can be removed from the vacuum chamber for further processing.

An important concept of this invention resides in the ability to make use of a mold of the type described for casting shapes of metals which cannot otherwise be cast in ceramic molds because of their reactivity with the silicon or because of their reactivity with the oxygen which might be present in the silica or the like ceramic materials whereby undesirable reactions occur between the molten metal and the oxide compounds present in the mold. Amongst the many other desirable characteristics, the mold embodies a desirable degree of porosity; high dimensional stability; a desirable balance of high strength and tear strength whereby the mold maintains shape during metal forming at high temperatures but without retaining so much strength as would cause tearing of the molded product responsive to differential shrinkage upon cooling; the ability to maintain an inert or reducing surface in contact with the molten metal for protection of the metal while in a molten or highly oxidizable state; and finally the ability to effect clean and complete separation of the mold from the molded product.

This phase of the invention will be described with reference to the casting of aluminum, it being understood that other metals such as Sierra metal SM302 or International Nickel Inco 100, which are subject to rapid oxidation or reaction with silica at elevated temperatures, may be similarly processed.

The graphite mold, in accordance with the procedure described in my copending application Serial No. 310,261, filed September 20, 1963, and entitled "Precision Mold and Method of Fabrication," is transferred to the vacuum pouring furnace and the metal is poured under vacuum into the mold, with or without preheating of the mold. When preheating is employed, it is unnecessary to preheat to a temperature in excess of 800° F. although preheating to higher temperatures may be employed.

The poured metal is allowed to cool in the vacuum chamber to a temperature below that at which oxidation can take place before removal of the mold for exposure of the poured mold to the atmosphere for further cooling.

By reason of the presence of graphite in the walls of the mold and by reason of the thinness of the mold walls, the heat can be conducted rapidly away from the cast molten metal. In the case of aluminum, for example, which is cast into the mold while in a molten state, the heat is conducted away from the cast metal so rapidly in a mold system embodying the features of this invention, that an amount of grain refinement is experienced which has not found its equal in cast aluminum products.

By reason of the character and composition of the mold with a graphite inner section and a ceramic outer section, the mold can be used for the casting of metals ordinarily having a melting point temperature too high for conventional ceramic molds of the type heretofore employed. Thus the mold of this invention can be used effectively for the casting of molten super-alloys of the type described or the refractory metals such as silicon, titanium, tantalum, and the like. In the molding of aluminum, the aluminum metal is reduced, preferably under vacuum, to a molten state in a melting furnace connected to the vacuum chamber and the metal is poured into the mold cavity merely by inverting the melting furnace. Usually an inert atmosphere is maintained in the melting furnace, or by the use of nitrogen, argon, or the like.

An important concept of the invention is unique to the type of mold that is produced. While the cast metal produced can be removed by conventional techniques of impacting and shaking to break up the mold and to free the casting and by blasting to remove material retained on the surfaces of the casting, the mold of this invention is capable of being cleanly and substantially completely removed to leave a clean casting merely by exposure to high temperature in an oxidizing atmosphere, as by heating in air, whereby graphite in the inner portions is consumed whereby the remainder of the mold can be easily and cleanly broken away.

It will be apparent from the foregoing that I have provided a method and means for the production of shaped metal products at low cost and at high yield and a method and means for producing shaped products of meterials which have otherwise been incapable of being produced or otherwise incapable of being produced at low cost.

It will be understood that changes may be made in the details of construction, arrangement and operation without departing from the spirit of the invention, especially as defined in the following claims.

I claim:
1. A mold for precision casting having a wall structure in cross section comprising an inner portion constituting not more than one-half the cross section and consisting essentially of graphitic materials formed of layers of a mixture of colloidal graphite and graphite flour alternating with a graphite stucco, and an outer portion constituting at least one-half of the cross section consisting essentially of ceramic materials formed of layers of ceramic flour and binder alternating with a ceramic stucco, and in which the colloidal graphite is present in an amount within the range of 1.5 to 10 percent by weight of the colloidal graphite and graphite flour in the inner portion of the mold.

2. A mold as claimed in claim 1 in which the colloidal graphite comprises graphite particles of less than 1 micron and in which the graphite flour comprises graphite particles of less than 200 mesh.

3. A mold as claimed in claim 1 in which the graphite stucco is of a particle size less than 30 mesh but more than 150 mesh.

4. A mold for precision casting having a wall structure in cross section comprising an inner portion constituting not more than one-half the cross section and consisting essentially of graphitic materials formed of layers of a mixture of colloidal graphite and graphite flour alternating with a graphite stucco, and an outer portion constituting at least one-half of the cross section consisting essentially of ceramic materials formed of layers of ceramic flour and binder alternating with a ceramic stucco, and in which the binder in the outer layers comprises colloidal graphite present in an amount within the range of 1.5 to 10 percent by weight of the combined colloidal graphite and ceramic flour.

5. In the method of producing a mold about a disposable pattern which is removed to define a mold cavity, the steps of wetting the surface of the pattern with an aqueous dip coat composition the essential solids of which consist of graphite flour and colloidal graphite, covering the surface of the pattern while wet with the dip coat composition with a graphite stucco, repeating the operations of wetting with the dip coat composition and stuccoing for a number of times with intervening drying, wetting the built up layers with a dip coat composition the essential solids of which consist of a ceramic flour and colloidal graphite, covering the surface while wet with the dip coat composition with a ceramic stucco, and repeating the operations of wetting with the dip coat composition and stuccoing a number of times with intervening drying until a mold of the desired thickness and strength is built up about the pattern, and in which the colloidal graphite in the dip coat composition applied in the outer layers is present in an amount within the range of 1.5 to 10 percent by weight of the total weight of the ceramic flour and the colloidal graphite.

6. In the method of producing a mold about a disposable pattern which is removed to define a mold cavity, the steps of wetting the surface of the pattern with an aqueous dip coat composition consisting essentially of the combination of a graphite flour, colloidal graphite and water, said colloidal graphite is present in an amount within the range of 1.5 to 10 percent by weight of the combined weight of the graphite flour and colloidal graphite, covering the surface of the pattern while wet with the dip coat composition with graphite stucco, repeating the operations of wetting with the dip coat composition and application of the stucco for a number of times to build up a layer of the graphitic materials on the pattern, thereafter wetting the built up layers with a slip coat composition consisting essentially of an inorganic binder, a ceramic flour, and water, covering the surface while wet with the dip coat composition with a ceramic stucco, repeating the operations of wetting with the dip coat composition and stuccoing a number of times until a mold of the desired wall thickness and strength is built up about the pattern.

7. The method as claimed in claim 6 in which the mold is fired at a temperature within the range of 800–2200° F. in a non-oxidizing atmosphere.

References Cited by the Examiner

UNITED STATES PATENTS

| | | | |
|---|---|---|---|
| 2,530,853 | 11/1950 | Brennan | 22—203 |
| 2,564,308 | 8/1951 | Nagle | 106—38.28 |
| 2,806,271 | 9/1957 | Operhall | 22—196 |
| 2,886,869 | 5/1959 | Webb et al. | 22—196 |
| 2,948,032 | 8/1960 | Reuter | 22—193 |
| 2,961,751 | 11/1960 | Operhall et al. | 22—193 |
| 3,005,244 | 10/1961 | Erdle et al. | 22—129 |
| 3,132,388 | 5/1964 | Grant | 22—196 |

J. SPENCER OVERHOLSER, *Primary Examiner.*

MARCUS U. LYONS, *Examiner.*

E. MAR, *Assistant Examiner.*